(12) United States Patent
Claseman

(10) Patent No.: US 7,325,060 B2
(45) Date of Patent: Jan. 29, 2008

(54) MANAGEMENT SYSTEM FOR HARDWARE NETWORK DEVICES

(75) Inventor: George R. Claseman, Campbell, CA (US)

(73) Assignee: Micrel, Inc., San Jose, CA (US)

( * ) Notice: Subject to any disclaimer, the term of this patent is extended or adjusted under 35 U.S.C. 154(b) by 393 days.

(21) Appl. No.: 10/801,726

(22) Filed: Mar. 15, 2004

(65) Prior Publication Data

US 2005/0204027 A1  Sep. 15, 2005

(51) Int. Cl.
H04L 12/66 (2006.01)
H04L 12/28 (2006.01)
G06F 15/173 (2006.01)

(52) U.S. Cl. ............... 709/225; 709/223; 370/401; 370/352; 370/396

(58) Field of Classification Search ........... 370/400, 370/401, 389, 217, 352, 218, 219; 714/10, 714/11; 709/202, 217, 218, 223, 238
See application file for complete search history.

(56) References Cited

U.S. PATENT DOCUMENTS

| | | | |
|---|---|---|---|
| 6,128,279 A * | 10/2000 | O'Neil et al. ............... 370/229 |
| 6,145,001 A | 11/2000 | Scholl et al. | |
| 6,167,450 A * | 12/2000 | Angwin et al. ............ 709/227 |
| 6,339,789 B1 | 1/2002 | Sugauchi et al. | |
| 6,343,323 B1 * | 1/2002 | Kalpio et al. ............... 709/229 |
| 6,345,303 B1 * | 2/2002 | Knauerhase et al. ........ 709/238 |
| 6,360,260 B1 | 3/2002 | Compliment et al. | |
| 6,445,695 B1 * | 9/2002 | Christie, IV .............. 370/352 |
| 6,469,986 B1 | 10/2002 | Lecheler et al. | |
| 6,480,901 B1 | 11/2002 | Weber et al. | |
| 6,526,448 B1 * | 2/2003 | Blewett ....................... 709/238 |
| 6,615,201 B1 | 9/2003 | Seshadri et al. | |
| 6,631,189 B2 | 10/2003 | Pasanen et al. | |
| 6,633,230 B2 | 10/2003 | Grandin et al. | |
| 6,687,732 B1 * | 2/2004 | Bector et al. .............. 709/200 |
| 6,792,461 B1 * | 9/2004 | Hericourt .................... 709/225 |

OTHER PUBLICATIONS

KS8695 Product Brief, Revision 1.07, "CENTAUR Integrated Multi-Port Gateway Solutions", Micrel Semiconductor data sheet, pp. 1-3.

(Continued)

Primary Examiner—Hanh Nguyen
(74) Attorney, Agent, or Firm—Carmen C. Cook; Patent Law Group LLP

(57) ABSTRACT

A management system for supporting management functions of managed network devices is formed by a backend management network providing processing capability to handle management transactions. In one embodiment, the management system is coupled to a first and a second network element connected to a data communication network and being managed by a network manager also connected to the data communication network. The management system includes a management network coupled to the first and second network elements and a processor element coupled to the management network and communicating with the first and second network elements through the management network. In operation, management transactions are transmitted to the managed network elements from the network manager through the data communication network. The management transactions are transmitted through the management network to the processor element where the management transactions are processed on behalf of the respective network elements.

26 Claims, 5 Drawing Sheets

OTHER PUBLICATIONS

KS8695 P Product Brief, Revision 1.2, "CENTAUR Integrated Multi-Port PCI Gateway Solution", Micrel Semiconductor data sheet, pp. 1-3.

KS8995M Product Brief, Revision 1.09, Integrated 5-Port 10/100 Managed Switch, Micrel Semiconductor data sheet, pp. 1-4.

* cited by examiner

MANAGEMENT SYSTEM FOR HARDWARE NETWORK DEVICES

FIELD OF THE INVENTION

The invention relates generally to an apparatus and a method for supporting the management of a data network, and more particularly to a management system and method for supporting the management functions of hardware network devices.

DESCRIPTION OF THE RELATED ART

The present invention concerns a data communications network, such as a local area network, a wide area network or a wireless communication system. FIG. 1 is a block diagram illustrating a conventional data communications network. A data communications network 10, hereinafter "a data network," includes hardware network elements 14 connected thereto for sending and receiving data packets in accordance with a predefined network protocol. In the present description, "hardware network elements" refer to communication infrastructure elements, such as hubs, gateways, switches, bridges or routers, that have multiple ports for interconnecting multiple media links on the data network. In the present description, "hardware network elements" also refer to host elements on the data network.

For instance, a hardware network element on a data network may operate to pass data packets received from one port to one or more of its other ports, depending upon the type and function of the hardware network element.

In a conventional data network, a computing device is usually designated as a network manager 12 for performing management functions to ensure that the data network is operating at the desired performance level. A network manager or multiple network managers connect to the data network and remotely operate management artifacts in each of the managed network elements. Typical network management functions include monitoring the presence of network elements 14, also called managed devices, as the devices are connected to or disconnected from the data network and detecting and correcting faults in the network. Management specifics are described in IETF MIB's for various devices that may wish to be managed. Network management is usually operated using a portion of the network bandwidth that also carries user data. The network manager uses in-band bandwidth to communicate to all managed devices of the network.

Inside of the managed device, an intelligence resides to interpret network management requests, form and send responses, manipulate local hardware, and send notifications as required. As illustrated in FIG. 1, most if not all managed network elements are made up of a networking hardware component 18, a local processor 16, and an interconnecting bus interface 17. providing communication between the network hardware and the processor. Processor 16 can be a stand-alone processor or an embedded processor of the network hardware. The bus interface is usually a standard interconnect bus, such as a PCI bus or a SPI serial interface bus. The local processor of the network element operates to handle and processor management requests.

Within the complexity of software, processor, system bus, and network devices are usually some tradeoffs or market pressures that direct the selection of what each of these components will be. In most cases, the processor may call out an interface bus that is not compatible with the interface bus supported by the network hardware component. Incompatibility issues between the network hardware and the processor increase the complexity of designing the network elements as a particular processor desired for network management may not work with the interface bus used by the network hardware.

Selecting the correct set of artifacts for the network elements is important for flexibility and morphing into new designs. In order to support a large number of bus technologies, more and more input/output pins are required for the network element so that the network element can remain flexible. Complexity of design and cost of implementation of such managed network devices are increased.

SUMMARY OF THE INVENTION

According to one aspect of the present invention, a management system for supporting management functions of managed network devices is disclosed. In one embodiment, the management system is coupled to a first and a second network element connected to a data communication network and being managed by a network manager also connected to the data communication network. The management system includes a management network coupled to the first and second network elements where the management network supports a standardized network interface. The management system also includes a processor element coupled to the management network and communicating with the first and second network elements through the management network. The processor element is capable of processing management transactions on behalf of managed devices. In operation, a first management transaction is transmitted to the first network element and a second management transaction is transmitted to the second network element from the network manager through the data communication network. The first and second management transactions are transmitted through the management network to the processor element, and the processor element processes the first and second management transactions on behalf of the first and the second network elements respectively.

In one embodiment, the processor element processes the management transactions by interpreting network management requests from the network manager, forming and sending responses to the network manager, forming instructions for manipulating hardware components of the network elements coupled thereto, and sending notifications to the network manager.

The present invention is better understood upon consideration of the detailed description below and the accompanying drawings.

DETAILED DESCRIPTION OF THE PREFERRED EMBODIMENTS

Figure 1:
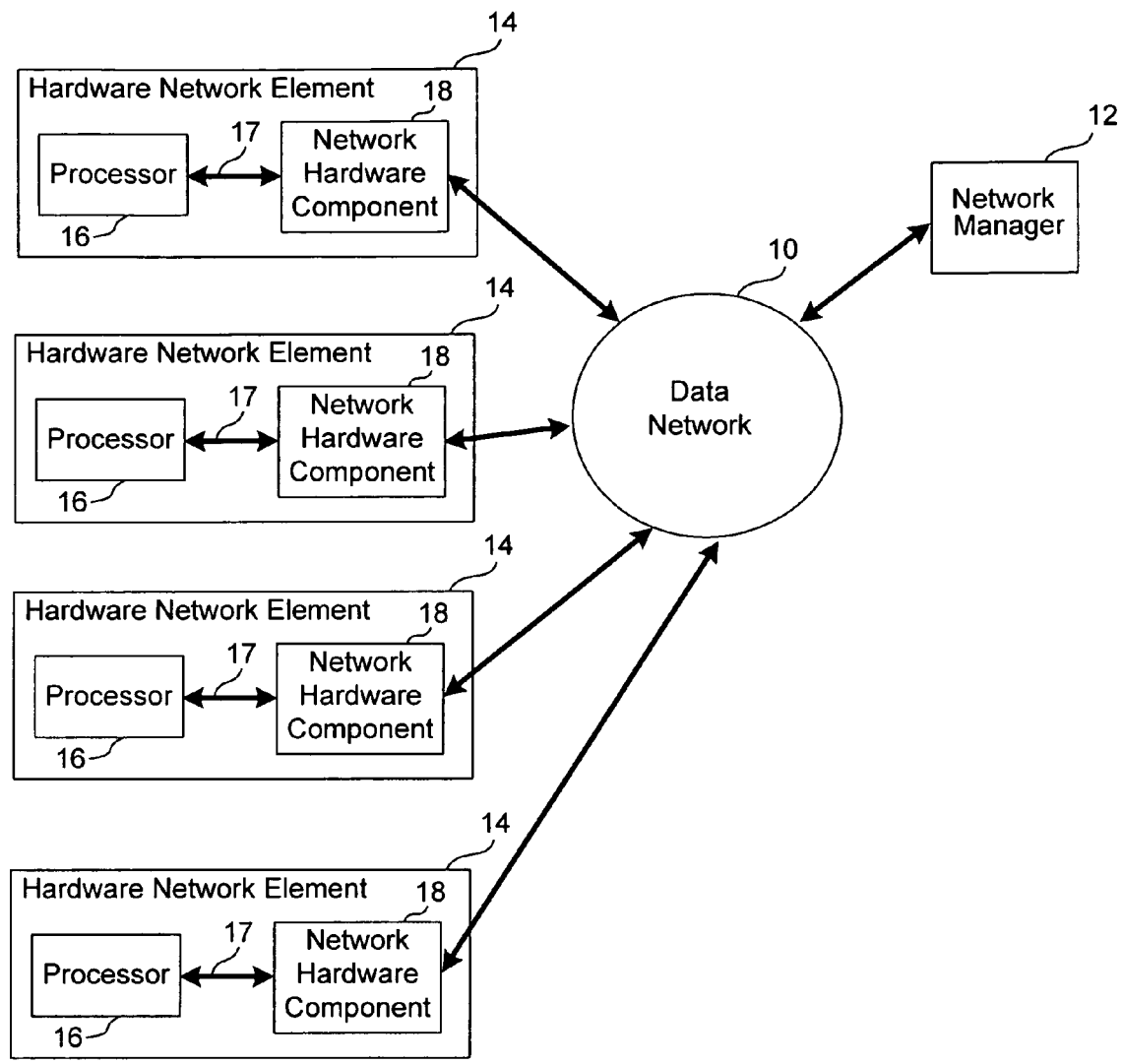
FIG. 1 is a block diagram illustrating a conventional data communications network.

In accordance with the principles of the present invention, a management system includes one or more processor elements coupled to a management data network to support the management functions of one or more managed hardware network elements. The processor elements communicate with the managed network elements through the management network using a standardized network interface, such as the Ethernet network interface. The management system of the present invention enables the decoupling of the management function from the network hardware of the managed network elements. Instead, one or more processor elements of the management system are used to support the management functions of the managed network elements through a backend data network. The network termination point of the management system can be provided with a variety of system bus interfaces for connecting to different processor types. The management system thus provides flexibility to system designers to select the desired processors and system busses for implementing the management system. The processor element of the management network can be a stand-alone processor device or an embedded processor of one of the managed network elements.

By using the management system of the present invention, the managed hardware network elements are remotely managed by one or more of the processor elements of the management system. In fact, the management system can be physically removed from the network hardware interface. For less expensive networks, the management system may include only one processor element shared among many hardware network elements. Decoupling the management support functions from the network element hardware allows independent selection of processors and system interfaces to be used for the management functions of the network elements. Moreover, when the management system of the present invention is used, the hardware network elements can be configured without a processor or without providing processing capability for performing the management functions as all management functions will be performed by the management system. In this manner, flexibility and cost reduction in the design of hardware network elements are realized. The management system can be implemented using a single processor to support the management of multiple hardware network elements. The management system thus enables a centralized management of multiple hardware network elements from a single point. Alternately, multiple processor elements can be coupled to the management data network to realize load or task sharing or to provide redundancy.

Importantly, the management system of the present invention provides flexibility by using a standardized network protocol for the management functions. For instance, a standard Ethernet network interface can be used to carry management transactions from and to the attached network elements as well as local database and to perform control register manipulation. The network hardware interfaces of the network elements can be run on other system busses such as PCI, ISA, I²C, and other such interfaces that multiplex address/data. However, once connected to the management data network, the management functions are communicated using the standardized network protocol. Thus, the implementation of the management system is not limited by the specific system busses or processor types called out by the hardware network elements.

The management system of the present invention provides many advantages over conventional network management schemes. First, the management system of the present invention realizes a dedicated backend management system where the processor element can be built using any desired processor and the design choice is not constrained by the hardware network elements. This provides flexibility and potential cost savings over conventional network management schemes where each hardware network element may dictate its own processor choice.

Second, the hardware network element only needs to support just one bus technology in order to connect to the management data network. Thus, the management system of the present invention allows the use of a single processor element to support multiple hardware network elements, even when the hardware network elements dictate dissimilar bus technology. To connect to the management data network, the hardware network elements would have a common network interface for the backend management system. A specific management bus on each of the hardware network elements is not needed.

Third, the management system can include multiple processor elements where the processor elements implement load/task sharing. Alternately, a subset of the processor elements is used for redundancy to implement failure resistant management and ensure a robust operation. The management network can use a simple control method to maintain the connections between the processor element and the locally managed devices to the management network. The management data network in the management system of the present invention can be implemented as a low complexity network so that redundant network paths are not required. The management system of the present invention, even with no network redundancy, is already more fault tolerant than conventional management schemes. If a high level of robustness is required, a fully redundant management network can be included where only one of the management networks is active at a time.

Fourth, the management system of the present invention is modular as the management system can be expanded by adding processor elements. Furthermore, the processor elements of the management system can also be replaced as needed such as to increase the computing power of the processor elements. For instance, a management system can start with a less powerful processor and then switch to a more powerful processor when the number of network elements increases or when new management tasks are needed to be processed.

In the present description, the term "a managed device" will be used to refer to a hardware network element, including infrastructure elements or host elements, that is coupled to a data network for performing application specific network functions where the hardware network element is managed by a network manager over the data network. A "managed device" is sometimes referred to as a managed network device, a managed element, or a managed network element.

Figure 2:
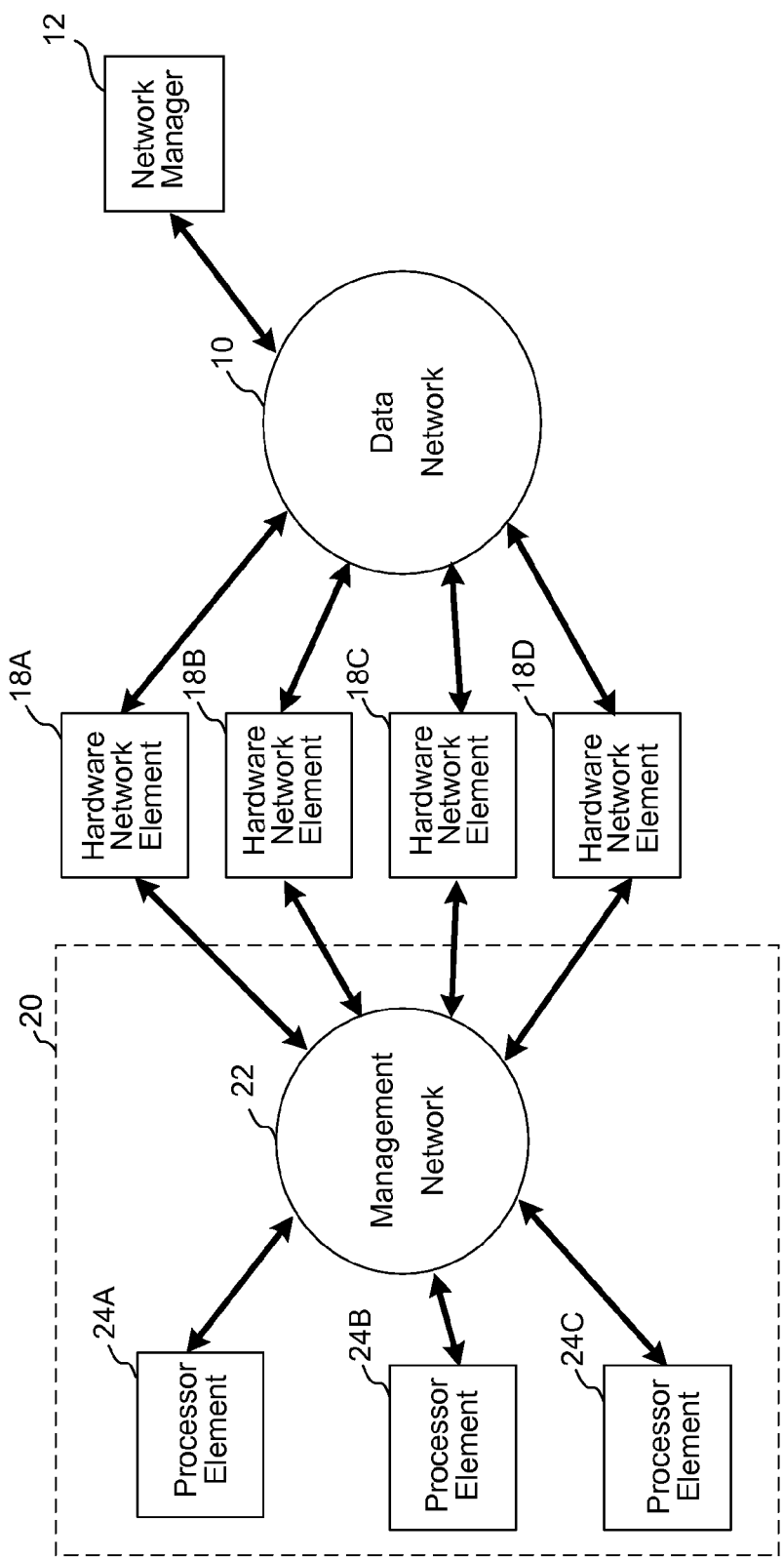
FIG. 2 is a block diagram of a management system coupled to support multiple hardware network elements according to one embodiment of the present invention.

FIG. 2 is a block diagram of a management system coupled to support multiple hardware network elements according to one embodiment of the present invention. Referring to FIG. 2, a series of hardware network elements 18A to 18D is connected to data network 10 as in FIG. 1. The hardware network elements are managed by network manager 12 and will be also referred to as managed devices 18A to 18D. Network manager 12 transmits management transactions, such as management requests, to the respective hardware network elements 18A to 18D over data network 10. In the present description, management transactions refer to management requests issued by the network manager intended for one or more of the hardware network elements for instructing the hardware network elements to perform certain management specific functions, such as data collection, hardware reconfiguration or transmitting notifications. For example, the network manager sets up the bounding conditions for the notifications and the managed devices send notifications as needed based on the bounding conditions.

In the present configuration, a management system 20 is provided to handle the management operations of managed devices 18A to 18D. Thus, managed devices 18A to 18D can be constructed with only the requisite network hardware and a communication port supporting a single network interface. A processor device for handling the management operation is not required in each of the hardware network elements.

In the embodiment shown in FIG. 2, management system 20 includes processor elements 24A to 24C and a management network 22 connecting to the managed devices and the processor elements. Management network 22 can be built to provide a variety of ports to allow processor devices with different system bus interface to be coupled to the management network. The design of the management system is thus not constrained by the requirements of a certain system bus for certain processor devices.

In accordance with the present invention, the processor elements and the managed devices communicate using a management protocol based on a standardized network interface. In the present embodiment, management communications between processor elements 24A-24C and managed devices 18A-18D are operated over standard Ethernet data frames that contain the MAC (media access control) addresses of the processor nodes and managed device nodes. In one embodiment, the management protocol operates as a SNAP protocol defined by the IEEE 802 committee incorporating a unique protocol identifier based on a registered OUI. As management network 22 is only used for management frames, the need for service multiplexing is not needed, however the means still exist if other data or control protocols wish to be utilized on the same network.

Figure 3:
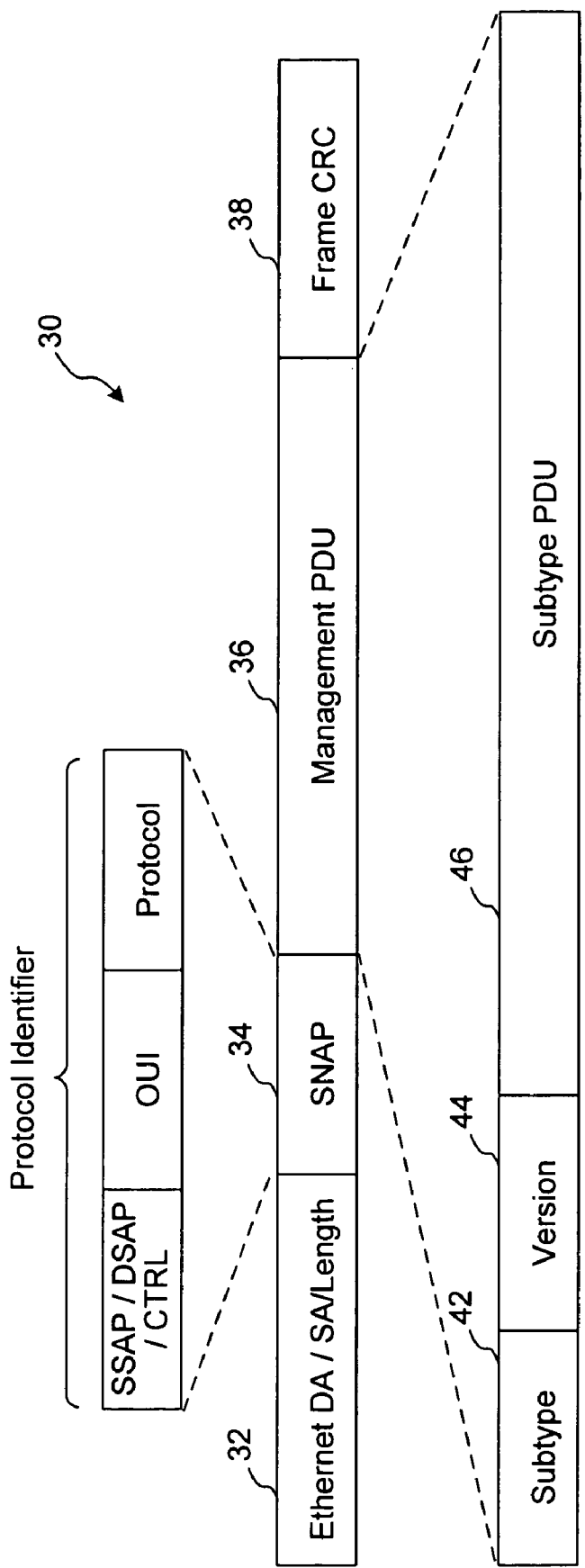
FIG. 3 illustrates an Ethernet data frame implementing the management protocol used by the management system according to one embodiment of the present invention.

FIG. 3 illustrates an Ethernet data frame implementing the management protocol used by the management system according to one embodiment of the present invention. Referring to FIG. 3, an Ethernet frame 30 used for management communication in management system 20 of the present invention includes a header field 32 identifying the MAC addresses of the destination device and the source device and the length of the Ethernet frame (Ethernet DA/SA/length).

Header field 32 is followed by a protocol identifier field 34 for identifying the management protocol being used. In the present implementation, protocol identifier field 34 is a SNAP header field 34 which is a standard method for calling out a next protocol header. The SNAP header field includes a SSAP/DSAP/CTRL field, an OUI field and a protocol enumeration field. For example, a SNAP header used in Token Ring (802.5) would have the following values for DSAP, SSAP and Ctrl: SSAP/DSAP=xAA and Ctrl=x03, where x designates hex. The OUI field will have a value of x000000 indicating that the protocol field is controlled by the IEEE 802 committee. The set of protocols defined by OUI=x000000 would directly translate to an Ethertype.

For the management protocol used by the management system of the present invention, the DSAP, SSAP and Ctrl can be the same as in the Token Ring case but the OUI field will be a vendor-specific code identifying the management protocol. The OUI field will contain a 3-octet value, such as x0010A1. After the OUI field, the protocol field is used to call out the unique protocol enumeration for identifying the management protocol being used. In operation, standard 802.1 bridges will forward the data frames based on the destination address DA. The ultimate DA will then need to interpret the protocol information. If a data frame is misdirected to a device that does not understand the management protocol, no action will take place.

Ethernet frame 30 further includes a management protocol data unit (PDU) 36 following the protocol identifier field. Management protocol data unit 36 contains a subtype field 42 for identifying the type of hardware network device. Each hardware network device may have unique feature sets and operations. The subtype field is used to specify a specific network device and each new device for defining the feature set of the device. After the subtype field, a version field 44 is provided to identify the specific version of the network device. By using a combination of the subtype field and the version field, a specific network product can evolve over time and variations of that product can be identified.

In operation, during the discovery process where processor elements determine the presence and identity of the hardware network elements connected to the management system, a hardware network element reports back to the processor elements using Ethernet frame 30 and identify using the subtype field and version field specifically what type of device it is.

Management protocol data unit 36 of Ethernet frame 30 further includes a subtype PDU field 46 for encoding the operational codes and data related to the subtype of the network device that the processor is communicating. Personality artifacts, such as specific operational features, of the hardware network element can be specified in subtype PDU field 46. Finally, Ethernet frame 30 includes a frame CRC (cyclic redundancy check) field 38 for providing error detection.

The operation of the management system of the present invention will now be described with reference to FIGS. 2 and 3 and the flow chart in FIG. 4. The four main operational steps of management system 20 are: (1) discovery of processor elements on the management network; (2) discovery of hardware network elements on the management network; (3) initialization of the hardware network elements; and (4) normal management operation.

Figure 4:
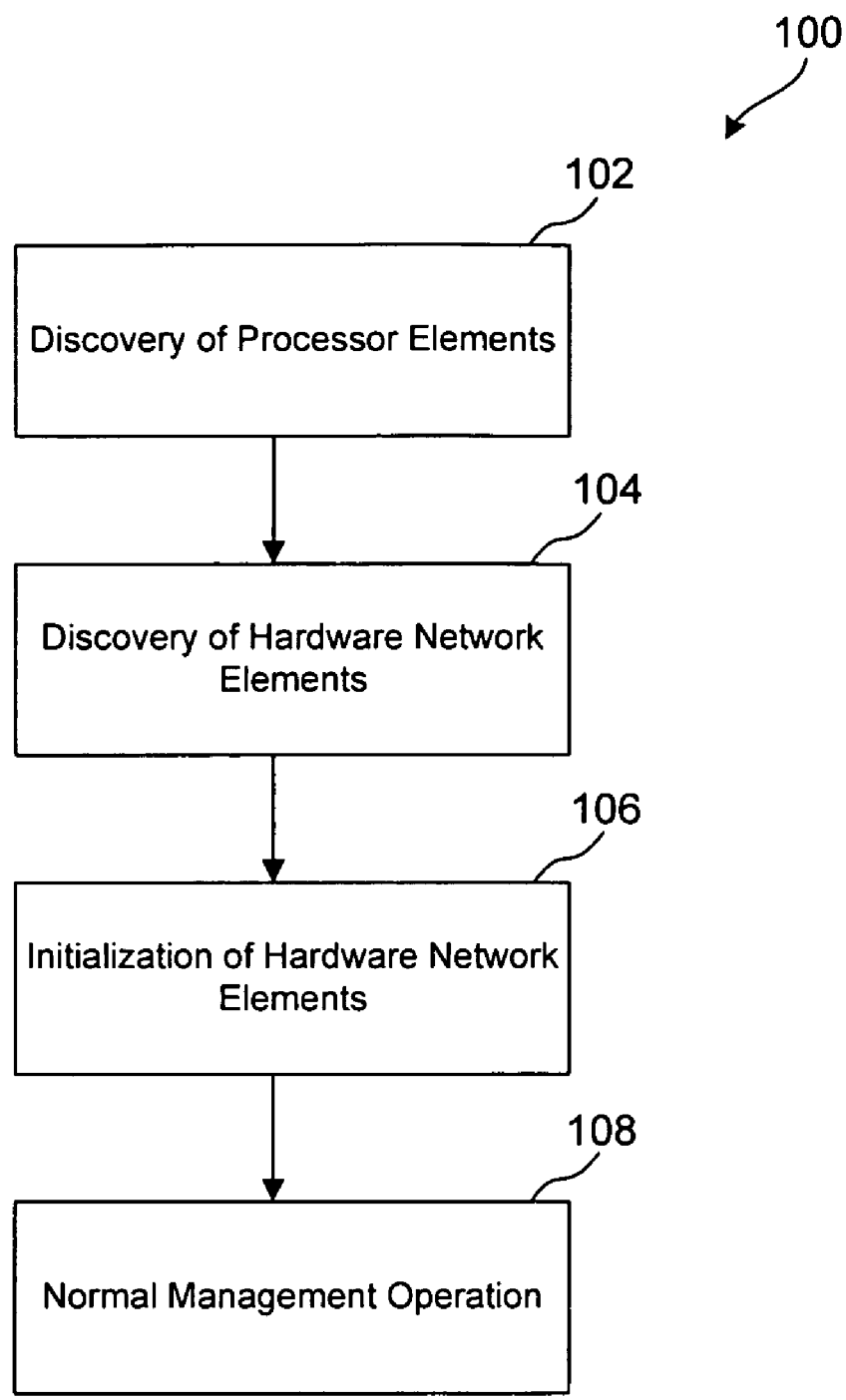
FIG. 4 is a flow chart illustrating the management protocol of the management system according to one embodiment of the present invention.

Referring to FIG. 4, upon connection of processor elements 24A-24C to management network 22, each of the processor elements must first discover the presence of other processor elements on the network. If multiple processor elements are present, then one of the processor elements is selected as the primary processor element. Other processor elements in the management network are then assigned specific functions. For instance, some of the processor elements can be used to distribute the management support functions of the hardware network elements. The distribution of the processors can be tasked or load oriented. Finally, some of the processor elements can be assigned as backup processor elements to provide redundancy.

In the present embodiment, discovery of processor elements is performed by each processor element sending a broadcast or multicast message that the processors on the management network recognize. The message can be sent using Ethernet frame 30 but using a specific protocol identifier in the SNAP header field which protocol identifier is understood only by the processor element. Because the hardware network elements attached to the management network would not recognize this specific protocol identifier, the hardware network elements will not respond.

Using a numerical precedence routine, a primary processor element is established. For example, a processor element with a more powerful processing device can be assigned a lower numerical value so that the processor element will be selected as the primary processor element. Once the primary processor element is established, the primary processor element can assign other processor elements on the management network as backup processors or can load share management tasks with the other processor elements. The load sharing can be physical division where a selected group of hardware network elements is assigned to the remaining processor elements. The load sharing can also be task division where a processor element is assigned for processing certain management tasks.

Once the primary processor element is established, the primary processor element then proceeds to discover the presence of hardware network elements that are connected to the management network. The primary processor element, also referred to as the manager node, sends a broadcast message to get a response from any connected hardware network element.

During the discovery process, the broadcast message is sent using the Ethernet frame as shown in FIG. 3 but with a generic subtype field so that all types of network devices can understand the discovery message. Hardware network elements, such as elements 18A-18D, that are connected to management network 22 each returns a message to the processor element conveying the MAC address and the personality artifacts of the respective hardware network element. In the present embodiment, the message is transmitted using the Ethernet frame of FIG. 3. The MAC address is specified in the source address SA field and the device type and version number of the hardware network element are specified in the subtype field and the version field of the management protocol data unit. Other personality information about the hardware network element can be specified in the subtype PDU field of Ethernet frame 30. Once the personality artifacts of the hardware are identified, the processor elements can start individual initialization of each hardware network element. The manager node may receive many response messages at once. The response messages can be queued up in a buffer of the processor elements.

In operation, the primary processor element sends discovery broadcast messages periodically to find out if any hardware network elements have been added or removed from the management network. By repeatedly sending the discovery broadcast message, protection against frame loss during transmission is also provided.

After the hardware network elements have been properly initialized, the management network can now resume normal operation supporting the management functions of the hardware network elements.

Communications between the hardware network elements and the processor elements over the management network can be generally divided into two groups. First, the hardware network elements receive and transmit network management messages over the data network. These network management messages are conveyed in encapsulated formats to and from the processor elements. For example, the hardware network elements may transmit notifications of certain events, traps and interrupts to the processor element. Second, the processor elements handle all the management transactions directed to the respective hardware network elements.

During normal operations, the hardware network elements may need to send notifications, such as traps, event, interrupts, to the processor elements. In the present embodiment, this type of transmission uses a broadcast frame so that all connected processors are notified. The processor that handles the particular hardware network element, as identified by the MAC source address in the broadcast frame, can service the event while the other processor elements ignore the notification. In this manner, all processor elements are made aware of the notification even though only one processor element acts on the notification.

During normal operations, the network manager of the data network will send a management transaction over the data network designated to one or more of the hardware network elements being managed by the network manager. In operation, the hardware network element receives a management transaction from the network manager over the data network. The hardware network element stores the transaction in a buffer and forwards the transaction to the respective processor element of the management system by encapsulating the transaction in the protocol frame of FIG. 3. The processor element, upon receipt of the management transaction, processes the management transaction and returns with the proper response, such as a control packet in the protocol frame, to the hardware network element.

In the present description, processing of the management transaction by a processor element includes evaluating or interpreting network management requests from the network manager, forming and sending responses to the network manager, forming instructions for manipulating hardware components of the respective hardware network elements being managed, and sending notifications to the network manager.

In other embodiments, instead of having the hardware network element forwarding the management transactions to the processor element, the processor element can be configured to read specific registers on the hardware network elements to retrieve the management commands. The processor element processes management transactions accordingly and can write specific registers in the hardware network element to configure the hardware components of the network element in response to the management request.

Figure 5:
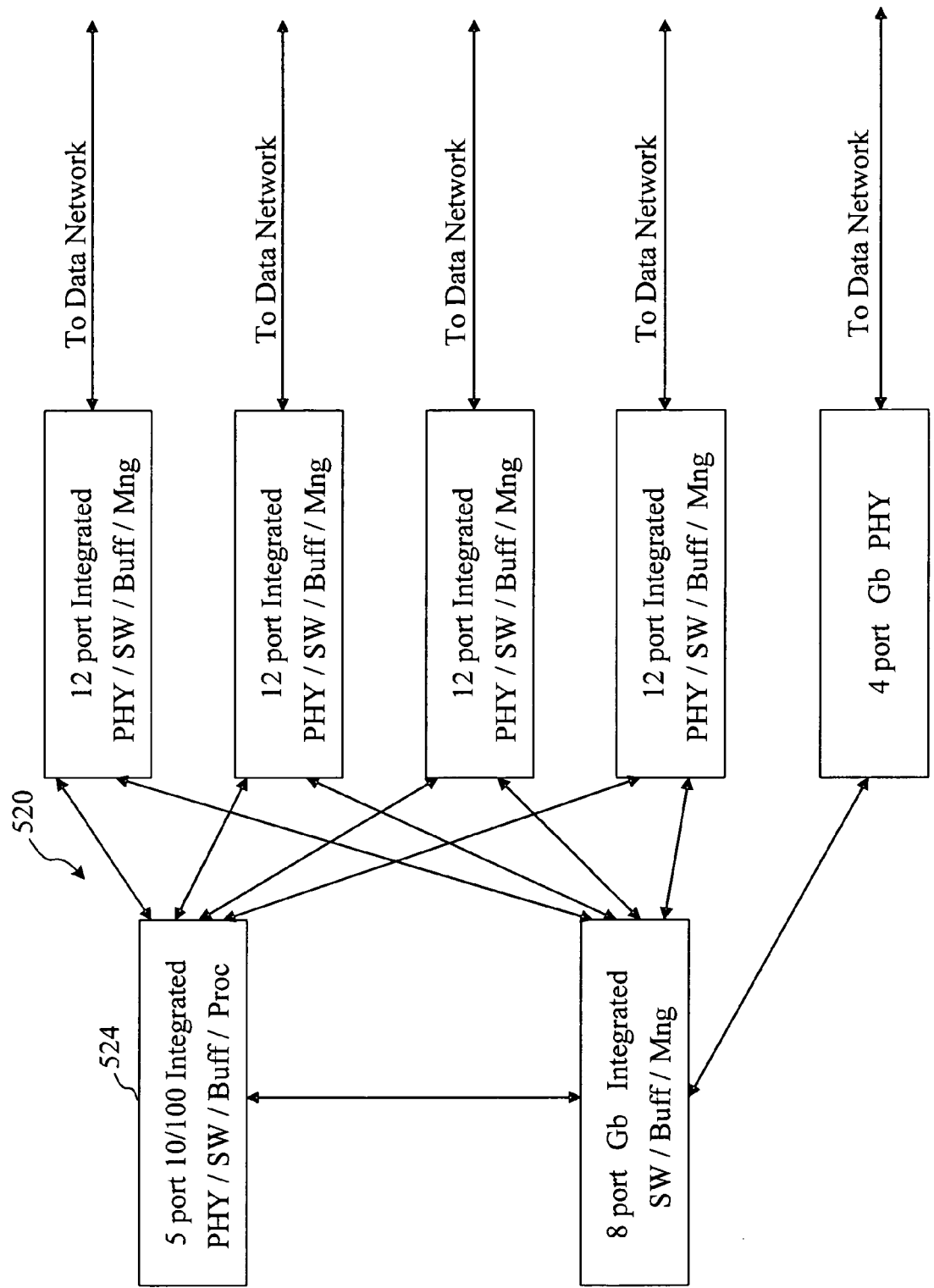
FIG. 5 is a block diagram of a management system implemented using a 5-port gateway device according to one embodiment of the present invention.

According to one embodiment of the present invention, a management system is implemented using a multi-port gateway device including an embedded processor and multiple communication ports. FIG. 5 is a block diagram of a management system implemented using a 5-port gateway device according to one embodiment of the present invention.

Referring to FIG. 5, a management system 520 is implemented using a 5-port gateway device. Management system 520 includes a processor element 524 which is an embedded ARM processor and also includes memory units and other control circuitry. Processor element 524 also includes five Ethernet transceivers as interfaces for coupling to five managed devices to form the management network. In the present illustration, four of the Ethernet ports are connected to integrated switches while the fifth Ethernet port is connected to an 8 port gigabits integrated switch. The switches are connected to the desired data network to provide the desired application specific functions.

According to another embodiment of the present invention, the management system is formed using an embedded processor of a hardware network element. The embedded processor element can be connected to a bridge or a switch to provide multi-port capability. In this manner, the processor element of one hardware network element can be used to form the backend management system for supporting the management functions of other hardware network elements without embedded processors.

For instance, in FIG. 5, processor element 524 can be itself a hardware network element. Processor element 524 is connected through the 8 port Integrated switch device to the data network and performs network specific functions. On the other hand, the Ethernet ports of the processor element are coupled to other hardware network elements for forming the management network. In this manner, the processing power provided by the ARM processor of processor element 524 is distributed to support the management functions of multiple hardware network elements. Such implementation provides a cost effective solution for implementing managed data networks.

The advantages of the management system of the present invention are numerous and will be summarized below.

First, by implementing a backend management network for managed devices, the management functions of multiple managed devices can be supported by a limited number of processor elements. More importantly, the management system of the present invention enables the management of multiple hardware network elements from a single manager node including a single processor element. The management system thus enables a cost efficient implementation of a data network of managed devices. Further cost saving can be achieved when the embedded processor of one of the network elements is used as the processor element and inband transfer of management transactions is utilized.

Second, the management system of the present invention provides a unique management protocol for the processor element to remotely manage one or more hardware network elements. The management protocol allows the processor element to identify the device types and other personality artifacts of the network elements so that effective management support can be provided.

Third, the management system of the present invention implements a discovery process for identifying the hardware network elements connected thereto. The discovery process retrieves the MAC addresses of the network elements as well as other personality artifacts of the network elements by using the unique management protocol of the present invention.

Fourth, the management system of the present invention can include multiple processor elements. Processor deference and management is provided to implement load distribution and load sharing. Processor task division can be done by physical groups or by protocol handling. Dividing the task by protocol allows more compact code on each managing processor element. Redundant processors can be included for failover and load sharing.

Fifth, the management system allows the modular addition of new processor elements to handle increasing workloads. Also, the modular nature of the processor elements allows for ready upgrade to increase the processing power of the processor elements.

The above detailed descriptions are provided to illustrate specific embodiments of the present invention and are not intended to be limiting. Numerous modifications and variations within the scope of the present invention are possible. The present invention is defined by the appended claims.

I claim:

1. A management system coupled to a first and a second network element connected to a data communication network and being managed by a network manager also connected to the data communication network, the management system comprising:

a management network coupled to the first and second network elements, the management network supporting a standardized network interface; and a processor element coupled to the management network and communicating with the first and second network elements through the management network, the processor element being capable of processing management transactions, wherein a first management transaction is transmitted to the first network element and a second management transaction is transmitted to the second network element from the network manager through the data communication network, the first and second management transactions are transmitted through the management network to the processor element, and the processor element processes the first and second management transactions on behalf of the first and the second network elements respectively.

2. The management system of claim 1, wherein processing management transactions comprises interpreting network management requests from the network manager, forming and sending responses to the network manager, forming instructions for manipulating hardware components of the network elements coupled thereto, and sending notifications to the network manager.

3. The management system of claim 1, wherein the processor element comprises an embedded processor in the first network element.

4. The management system of claim 3, wherein the first network element comprises a multi-port network element, the second network element being coupled to one of the ports of the first network element to form the management network.

5. The management system of claim 1, wherein the management network comprises a network implementing the Ethernet network interface.

6. The management system of claim 1, wherein the first and second network elements and the processor element communicate using a data frame of the standardized network interface, the data frame comprising a header field specifying the source and destination addresses, the length of the data frame, a protocol identifier field for identifying the communication protocol being used, and a management protocol data unit field for specifying operational features of the network elements.

7. The management system of claim 6, wherein the management protocol data unit field comprises a subtype field for specifying the device type of the network element, a version field for specifying the version of the device type and a subtype data unit field for specifying other operational features of the network element.

8. The management system of claim 1, wherein the management system comprises a plurality of processor elements coupled to the management network where the processor element is a first processor element of the plurality of possessor elements, the plurality of processor elements each capable of processing management transactions on behalf of one or more network elements.

9. The management system of claim 8, wherein the first processor element comprises the primary processor element of the management system operating to at least manage the functions of the other processor elements.

10. The management system of claim 9, wherein the primary processor element operates to distribute and assign management tasks among the other ones of the plurality of processor elements.

11. The management system of claim 9, wherein the first and second network elements are part of a plurality of network elements being coupled to the management system, and wherein the primary processor element implements load sharing by assigning a second processor element to handle management transactions for a first group of network elements and a third processor element to handle management transactions for a second group of network elements.

12. The management system of claim 8, wherein at least one of the plurality of processor elements is designated as a redundant processor to be activated when another one of the plurality of processor elements is inoperative.

13. The management system of claim 1, wherein the first and second management transactions are transmitted through the management network to the processor element by transmitting messages from the first and second network elements to the processor element which messages contain the management transactions.

14. The management system of claim 1, wherein the first and second management transactions are transmitted through the management network to the processor element by reading respective memory locations of the first and second network elements to retrieve the management transactions.

15. A method for processing a management transaction transmitted by a network manager over a data communication network and designated for a managed network element connected to the data communication network, the method comprising:
   coupling the managed network element to a processor element through a management network implementing a standardized network interface;
   transmitting a message from the managed network element to the processor element containing information identifying the operational features of the managed network element;
   providing the management transaction to the processor element;
   processing the management transaction at the processor element; and
   transmitting a message from the processor element to the managed network element in response to and in accordance with the management transaction.

16. The method of claim 15, wherein prior to transmitting a message from the managed network element to the processor element, the method comprises:
   transmitting a broadcast message from the processor element over the management network, the broadcast message requesting any managed network element connected to the management network to transmit a message in response identifying the address of the responding managed network element.

17. The method of claim 16, wherein transmitting a message from the managed network element to the processor element comprises:
   transmitting a message to the processor element identifying the address of the managed network element and specifying the operational features of the managed network element.

18. The method of claim 17, wherein the standardized network interface comprises an Ethernet network interface and wherein transmitting a message to the processor element comprises:
   encapsulating the message in a data frame, the data frame comprising a header field specifying the source address of the managed network element and the destination address of the message, a protocol identifier field for identifying the communication protocol being used, and a management protocol data unit field for specifying operational features of the managed network element sending the message.

19. The method of claim 15, wherein coupling the managed network element to a processor element through a management network comprises:
   coupling a plurality of processor elements to the management network;
   transmitting a message over the management network to the plurality of processor elements;
   at each processor element, receiving messages from the other ones of the plurality of processor element identifying the presence of the processor elements; and
   selecting a first processor element as the primary processor element for operating to at least manage the functions of the other of the plurality of processor elements.

20. The method of claim 19, wherein transmitting a message over the management network to the plurality of processor elements comprises transmitting a broadcast message over the management network to the plurality of processor elements.

21. The method of claim 19, wherein transmitting a message over the management network to the plurality of processor elements comprises transmitting a multicast message over the management network to the plurality of processor elements.

22. The method of claim 19, further comprising:
   assigning by the primary processor element management tasks among the other ones of the plurality of processor elements.

23. The method of claim 19, wherein coupling the managed network element to a processor element through a management network comprises coupling a plurality of managed network elements to the plurality of processor elements through the management network, and the method further comprises:
   assigning by the primary processor element one or more managed network elements from among the plurality of managed network elements to be managed by a second processor element of the plurality of processor elements.

24. The method of claim 19, further comprising:
   assigning a second processor element of the plurality of processor elements as a redundant processor to be activated when another one of the plurality of processor elements is inoperative.

25. The method of claim 15, wherein providing the management transaction to the processor element comprises:
   sending a message containing the management transaction from the managed network element to the processor element through the management network.

26. The method of claim 15, wherein providing the management transaction to the processor element comprises:
   retrieving by the processor element the management transaction by reading the management transaction from memory locations of the managed network element.

* * * * *